July 28, 1964 E. VEYRET 3,142,359
APPARATUS FOR CORRECTING AND PREVENTING SKID IN VEHICLES
Filed Nov. 29, 1962 5 Sheets-Sheet 3
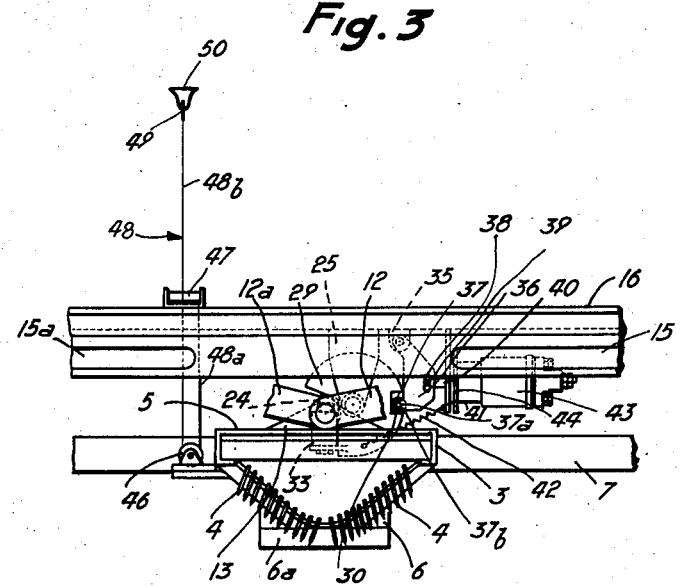
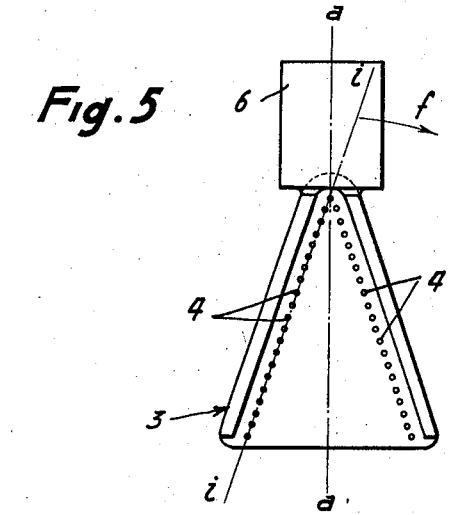
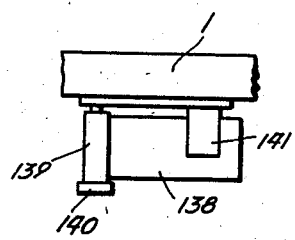
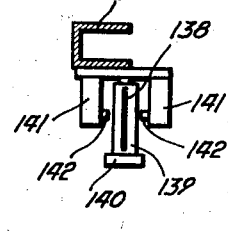
Inventor:
Emmanuel Veyret
BY Baldwin & Wight
Attorneys

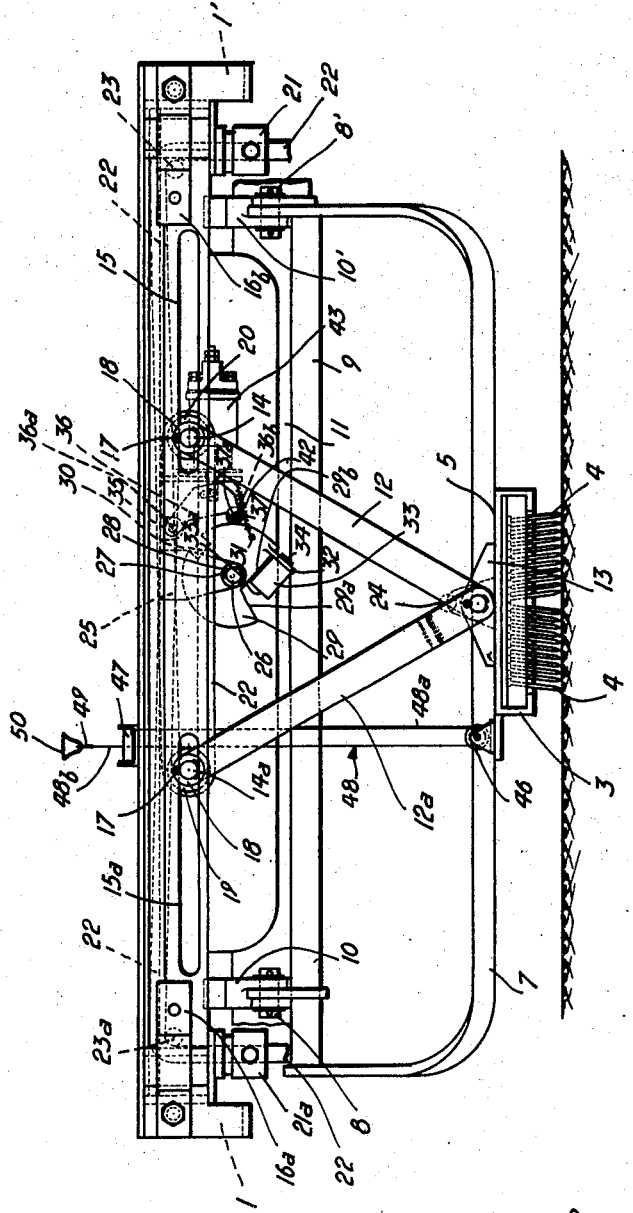

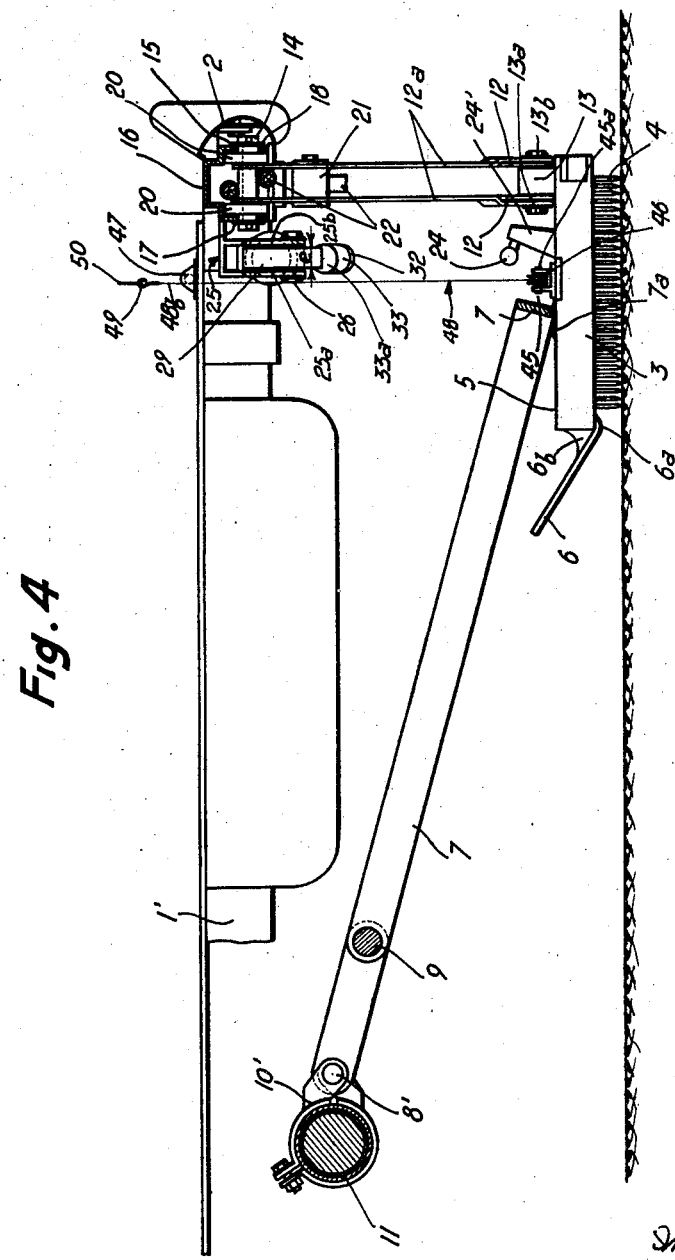

July 28, 1964   E. VEYRET   3,142,359
APPARATUS FOR CORRECTING AND PREVENTING SKID IN VEHICLES
Filed Nov. 29, 1962   5 Sheets-Sheet 5

Inventor:
Emmanuel Veyret
BY Baldwin & Wight
Attorneys

United States Patent Office 3,142,359
Patented July 28, 1964

3,142,359
APPARATUS FOR CORRECTING AND
PREVENTING SKID IN VEHICLES
Emmanuel Veyret, 164 Ave. de Suffren, Paris, France
Filed Nov. 29, 1962, Ser. No. 242,866
Claims priority, application France Dec. 5, 1961
8 Claims. (Cl. 188—5)

The purpose of this invention is to provide a method and means for straightening out a vehicle on its path, when the vehicle, moving along a slippery roadway, is caused to skid, resulting in a deviation of its longitudinal axis with respect to the path of its center of gravity.

French Patent No. 1,196,182, filed in the name of the present applicant, described a method consisting essentially in applying to the vehicle a force having a direction opposite to the velocity of the vehicle, by applying to the roadway a friction means located as far to the rear on the longitudinal axis of the vehicle as possible. The friction means is preferably itself flexible and under the action of elastic means, and exerts, with respect to the weight of the vehicle, only a relatively weak force on the roadway, thereby producing, aside from its effect of straightening out, no other notable reaction.

Arrangements for attempting to prevent the sideways sliding of vehicles, such as rollers and brushes located at the rear of the automobile, are known. These arrangements are intended only to oppose sideways sliding, and not to create a straightening out couple that forms a reaction force at the center of gravity of the vehicle. During their application to the roadway they do not, as in accordance with the present invention, give rise to a notable systematic friction force (even before the vehicle begins to slew or whip around), whereby a couple can be formed at the beginning of the slightest discrepancy between the longitudinal axis of the vehicle and the path of its center of gravity.

It must be remarked that it is this novel concept of a couple that has led to locating the friction point as far to the rear of the center of gravity as possible, wherefrom the size of the couple is chiefly proportional to the distance between the center of gravity and the friction point.

This invention proposes an apparatus which, based on the principle of the aforementioned French Patent No. 1,196,182, consists of a combination of novel means for quickly and thoroughly straightening out a skidding vehicle.

There shall now be described the practical and theoretical proofs upon which the invention is based.

(1) To be truly operative, the mechanism must have an optimum coefficient of friction, whatever the slippery surface upon which it is used. The mechanism must be capable of tolerating roughness and bumpiness in the surface, so that, on the one hand, the coefficient of friction is not discontinuous and, on the other hand, there is no risk of a sudden catching resulting from the friction element or block jamming in the roadway. Finally, while having the mechanical properties necessary to resist wear, the friction element such as a friction block must also be flexible and have little inertia.

(2) The coefficient of friction must increase when the axis of the vehicle begins to shift to start the vehicle rotating about its center of gravity, in order to further increase the instantaneous size of the straightening couple when the sliding begins. It is well to notice here that the action of the desired couple is relative, since it opposes the effect of the friction of the rubber tires on the roadway.

(3) In order to keep a constant maximal coefficient of friction during the entire interval that the mechanism is used, the friction block or brush must be so shaped that, foreign bodies (fine gravel, snow, ice, and tar, for example) that accidentally get into it do not remain there and risk causing a clog that would impair operation of the block or brush.

(4) With regard to using the mechanism on an automobile, it is obvious that the normal operation of the automobile must not be affected by the installation of the mechanism. In other words, it is necessary, on the one hand, to be able to easily retract the mechanism, such that the clearance between the lowest part of the vehicle frame and the surface is not reduced and, on the other hand, to have a retraction arrangement that is certain, robust, and noiseless.

The mechanism of the invention satisfies these principal conditions and, by applying a friction element to the roadway, it straightens out the path of a sliding vehicle. The mechanism is characterized by having one or more friction blocks, elements, or brushes located at one end of a frame pivotally mounted at its other end on an axle parallel to the rear axle of the vehicle, such that the one or more friction elements are held at the rear part of vehicle in its median longitudinal plane, while two levers located in a substantially vertical plane and pivotally mounted at their lower ends on the friction element are mounted at their upper ends on the frame of the vehicle, which upper ends are normally spaced apart against the pull of elastic means that, under certain circumstances, cause these two ends to approach, by having means for holding the friction element in a retracted position against the action of the elastic means, means under control of the driver or operator of the vehicle for disengaging the element, and, finally, means for retracting the friction element into a position under the vehicle frame.

The frame supporting the friction element is preferably a triangulated arm which can be pivotally mounted on either a suspended member of the vehicle, as under the body, or a non-suspended member, such as the rear axle.

The upper ends of the two levers can be slidably mounted in grooves of a suspended or non-suspended member of the vehicle. The elastic means urging these two upper ends together can consist of one or more rubber bands or belts forming a common loop at these two ends and anchored at either side of the vehicle.

One embodiment of the invention, as applied to an automobile, will now be described in detail, with reference to the following drawings, in which:

FIGURE 2 is a rear view of the combination when the friction element is in contact with the surface;

FIGURE 3 is a detail view of the locking mechanism and its control means for the raised position of the friction element;

FIGURE 4 is a side view of the combination, with the friction element lowered;

FIGURE 5 is a bottom view of the friction element;

FIGURE 6 is an enlarged sectional view showing the arrangement of the metallic elements of the friction element;

FIGURE 7 is a view in lateral elevation of a switch arrangement for automatic control of the mechanism;

FIGURE 8 is an end view of the means of FIGURE 7;

Figure 9:
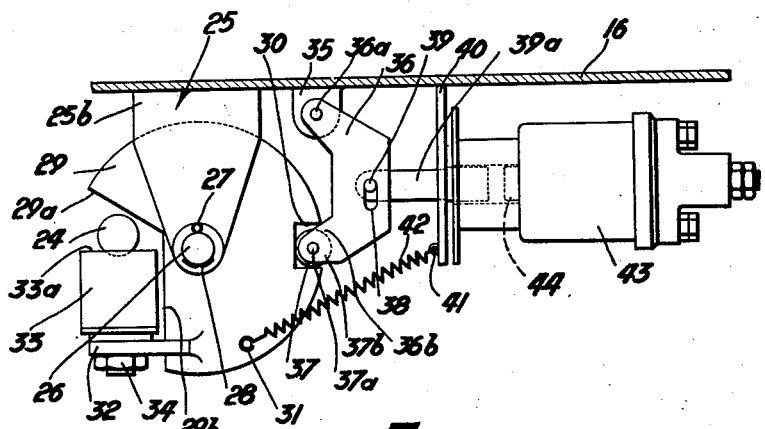
FIGURE 9 is an enlarged scale, fragmentary rear elevational view of locking mechanism, also shown in FIGURES 2 and 3, FIGURE 9 showing the locking mechanism in the locking condition for holding the friction element in its upper or raised position.
Figure 10:
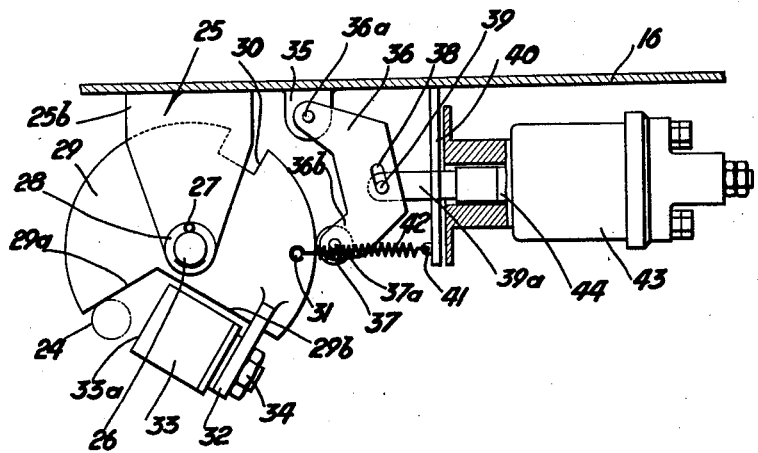
Figure 11:
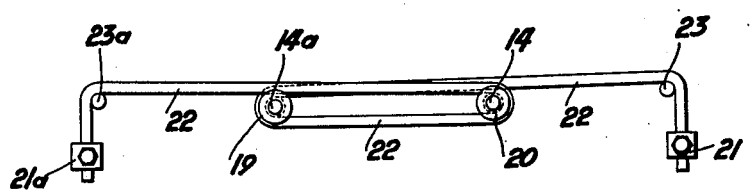

FIGURE 10 is a view similar to FIGURE 9 but showing the locking mechanism in an actuated condition for releasing the friction element to permit it to move to its lower position shown in FIGURES 2 and 4; and FIGURE 11 is a diagrammatic view showing the connections of a resilient strap to the vehicle frame and to parts of an actuating mechanism for moving the friction element to its lower position and holding it against a roadway or the like surface.

As shown, the mechanism, attached at the rear of an automobile, of which only a portion of the frame 1 and 1' and the rear bumper 2 are shown, essentially comprises a friction element or block 3, shown in detail in FIGURES 5 and 6. The general appearance of the element or block is that of an isosceles triangle with rounded apices, of which the base is perpendicular to the longitudinal axis of the vehicle and the top apex points in the direction of forward movement. The friction element or block proper is composed of metallic elements 4 that contact the surface at their one end, the extremities 4a of which are pointed, while the other end is a flat head buried in a lower rubber mass or block 3b at a depth equal to the thickness of the block. Surmounting this block is an upper rubber mass or block 3a of thickness $d$ (several millimeters). The combination of 3a and 3b is held together by a metallic frame 5, the turned down edges of which grip rubber block 3b. The metallic elements can be coated with a lubricant—preferably graphite—which permits them to slide in the rubber block 3b. This longitudinal sliding of the metallic elements is a feature that improves contact between the friction block or element and the roadway (which is never absolutely level).

In addition, the metallic elements, as shown in FIGURES 2 and 6, are inclined at an angle $\alpha$, which may be, for example, between 5° and 25°, with respect to the vertical. Each pair of elements is symmetrical with respect to the longitudinal axis of the vehicle. The minimum number of metallic elements can be determined approximately as a function of the weight of the vehicle and the results sought. For practical reasons, the elements 4 are advantageously hard steel nails. The friction block or element of the invention permits the obtaining of an excellent coefficient of friction, due to the arrangement and shape of the metallic elements, on the one hand, and to their particular orientation with respect to the roadway, on the other.

When the vehicle begins to skid, it is desirable that the friction block immediately act to provide a strong resistant force. To this end, the applicant conceived the solution of inclining the metallic elements at an angle $\alpha$, as just described. Thus, as soon as the friction block contacts the surface, the metallic elements are subjected to the rotational couple of the vehicle (in the direction of arrow $f$ of FIGURE 5, for example); and, because their tips 4a contact the roadway surface, the most active metallic elements (those located to the left of axis $aa$ in FIGURE 5, when the skid is in the direction of arrow $f$) are straightened out (the elasticity of the rubber block 3b permitting this) and take on a substantially vertical position under use. The friction block or element of the invention also is flexible and elastic in a plane parallel to that of the surface, as well as in a plane normal thereto, due to the special mounting of the elements 4 in the rubber blocks 3a and 3b. The rubber block 3a, by virtue of its thickness, absorbs the perpendicular shocks from the surface, while block 3b absorbs the strain of the elements 4, all while simultaneously permitting relative movement of the elements 4 with respect to each other and with respect to the surface. The relative play permitted between the elements 4 acts to inhibit the friction block being clogged by foreign bodies coming from the roadway. When the friction block contacts an insufficiently hard surface (snow, melting ice, or debris, for example), the pieces can be thrown off due to the V arrangement of the metallic elements, which avoids clogging of the block. In addition, there is provided a rigid plate 6 (of steel, for example) inclined with respect to the roadway and rigidly attached to the apex of frame 5 in any known way, as by weld 6b, for example. The portion 6a of plate 6, which contacts frame 5, is advantageously rounded (FIGURE 4). If a solid foreign body of considerable thickness (such as a stone, a piece of the pavement, a stick of wood, etc.) is lying on the roadway, it strikes the plate 6 and, due to the bent part 6a, only raises the friction block without damaging it.

Frame 5 is supported by a rigid frame 7 pivoting at 8 and 8' on collars 10 and 10' enclosing the housing of the rear axle 11 of the vehicle. The frame 7 is fixed, for example, to the frame 5 by a weld 7a (FIGURE 4) along the line of contact between the two frames. The rigidity of 7 can be insured by a bar or tube 9.

The pivot points 8 and 8' define an axis parallel to the rear axle, about which frame 7—and consequently, the friction block—can oscillate.

Two levers, each consisting of a pair of flat irons 12 and 12a, are pivoted at one end on two axles 13a and 13b on each side of an ear 13 welded to the upper surface of frame 5. At their other ends levers 12 and 12a are respectively connected to rod devices 14 and 14a engaged in the elongated slots 15 and 15a which are arranged in the two wings of the channel shaped member 16 secured to the rear of the vehicle, as by brackets 16a and 16b fastened in any convenient manner to the frame 1 and 1' of the vehicle. Rods 14 and 14a are held in place by cotter pins 17 and washers 18. The rods support two rollers 19 and 20 mounted for free rotation and resting upon an interior surface of the member 16. Two clamping blocks 21 and 21a, each holding the end of a round rubber strap or belt 22, are located near the ends of member 16. The strap is so arranged that the end held in block 21a passes, first of all, over axle 23a (in member 16) then about rod 14, next in the opposite direction about rod 14a, then over axle 23 (23 and 23a being symmetrical with respect to the median longitudinal plane of the vehicle), and finally enters block 21, as shown in FIGURE 11. Such an arrangement of the strap has the advantage of reducing the stretching of the rubber between the lowered and raised positions of the mechanism to a minimum.

A bracket-like latch member 24' having a substantially round part or knob 24, cooperable with a locking mechanism, is mounted on the upper surface of frame 5. The locking mechanism will now be described.

A support 25, secured to member 16 in any appropriate way (screws, weld, etc.), has two vertical ears 25a and 25b spanned by an axle 26 parallel to the longitudinal axis of the vehicle and supplied with cotter pins 27 and washers 28. A circular cam 29 rotatably mounted on axle 26 is held between the ears 25a and 25b. The cam is provided with a notch 30 of substantially square cross section and two planar faces or surfaces 29a and 29b, as can be seen in FIGURES 9 and 10. In other words, cam 29 approximately has the shape of a sector of thickness $e$ (FIGURE 4) limited by faces 29a and 29b and having a recess of substantially square cross section. A pin 31 is secured in one of the lateral faces of the cam. A plate 32 perpendicular to planar face 29b of the cam and carrying a cylindrical block 33 of rubber or plastic firmly held by a bolt or pin 34 is attached to the cam, as by welding, for example. The combination of planar face 29a and face 33a of block 33 form a kind of socket that receives knob 24 when the friction block is retracted.

A retaining element or member 36 is rotatably mounted at its upper end 36a on a foot 35 welded to member 16. The lower end 36b of member 36 is comprised of two ears holding between them a roller part 37 rotatably mounted on an axle 37a. The member 36 includes a slot 38 cooperating with a pivot 39 fast with a stem 39a rigid with a vertical metal armature plate 40 carrying a pin 41. A spring 42, the ends of which are held by pins 31 and 41, respectively located on cam 29 and plate 40, tends to draw the plate 40 and cam 29 relatively together.

An electromagnet or solenoid 43 is secured to member 16 in any known manner, such that the core 44 of the solenoid cooperates with i.e. is positioned to attract the armature plate 40. The solenoid is powered from an electrical circuit having a push button switch located within reach of the vehicle driver. The electrical circuit is not shown, to avoid needless detail in the drawings. The source of power can be the storage battery of the vehicle, for example.

A foot 45, having an axle 45a and a small pulley 46 turning thereon, is fixed to frame 5 of the friction block 3. A member 47 is located on member 16 plumb with the foot 45. A restoring cable or other linking means 48 secured to member 47 forms a descending length 48a, passes about pulley 46, and forms an ascending length 48b, which ends in a hook 49 and a removable handle 50. Without exceeding the scope of the invention, it is equally possible to conceive of means for automatically raising the friction block 3, such as an electric control system located within reach of the driver.

The mechanism just described operates in the following manner.

Ordinarily, the friction block 3 and its frame or casing 5 are retracted under the frame of the vehicle, in the position of FIGURE 3, in which the locking means of the mechanism is shown. In this position the electromagnet 43 is not powered and consequently does not attract plate 40 and member 36. The roller 37 is seated in slot 30 of the cam 29 and knob 24 is seated between the planar face 29a of the cam and face 33a of the resilient block 33. Moreover, spring 42 assures a firm contact between the cam 29 and the roller 37, further contributing to the locking of the combination. The resilient block 33 advantageously absorbs the small relative movements between frame 7 supporting the friction block 3 and the frame of the vehicle when the latter is underway. It will be seen that the arrangement is extremely robust and immune to damage that could be caused by relative movement between its parts. The friction block is thus held raised. The levers 12 and 12a are spread apart as shown in FIGURE 3. The rubber belt 22 is rather severely stretched and exerts a constant pull on the rods 14 and 14a.

Figure 1:
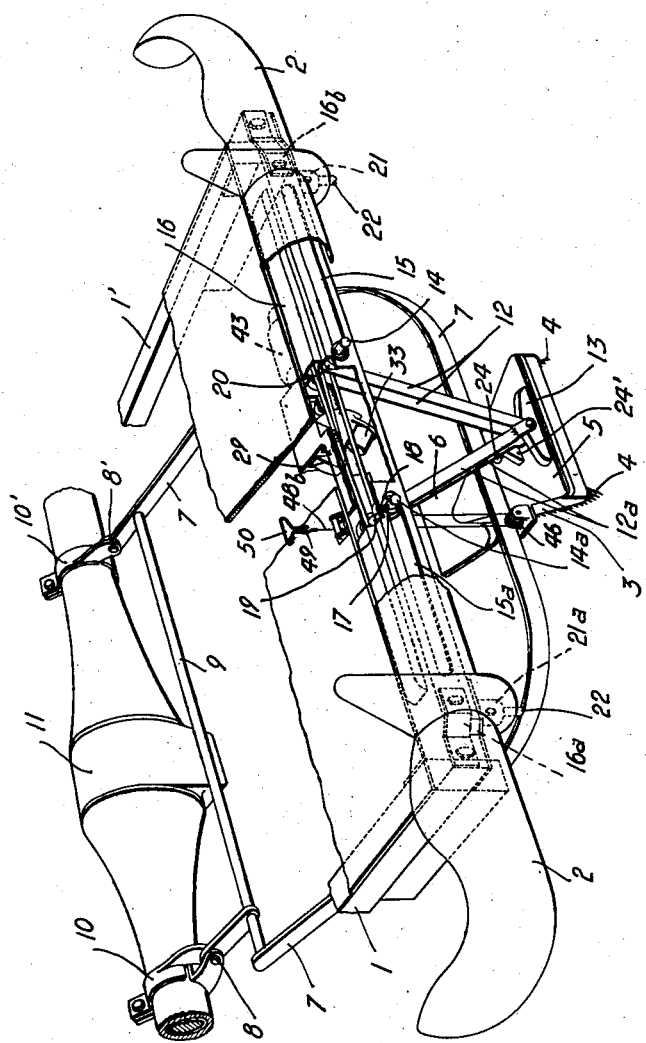
FIGURE 1 is a perspective view of the combination of the invention.

When the driver notices that his vehicle begins to skid, he presses the button that closes the circuit. The solenoid 43 is powered, causing the core 44 to attract the plate 40 and move it to the right (FIGURE 3) against the pull of the elastic spring means 42. The consequent movement of pin 39 in slot 38 causes member 36 to rotate on fixed axle 36a, freeing roller 37 from notch 30, resulting in the unlocking of cam 29. Under the pull of the rubber belt 22, the rods 14 and 14a are abruptly drawn towards each other, causing the friction block or element to be lowered to the surface (the position of FIGURES 1, 2 and 4). The metal elements 4 are thus put into action and their powerful rubbing on the surface of the roadway insures the formation of a couple that straightens out the vehicle, as described. When the vehicle is straightened out, the driver pulls on the wire or cable 48 by means of handle 50 until the friction block, rising against the pull of the rubber belt 22, is once again locked. As the rising block nears its locked position, knob 24, strikes the planar face 29a of the cam, causing the latter to rotate clockwise (FIGURE 2). The roller 37, urged by spring 42, engages in slot 30, and the mechanism is once again in the position of FIGURE 3. Hook 49 can then be put at some point provided for it, for example, on the body of the vehicle and the demountable handle 50 removed.

Then tension of the rubber belt 22 is adjusted so that when the friction block 3 is lowered it presses sufficiently firmly on the surface to obtain the desired friction. It will be noticed that, due to the arrangement of arms 12 and 12a and rubber belt 22 forming a loop around rods 14 and 14a, the effort required to retract the friction block 3 becomes less the higher the block is raised and that the lowering of the block is effected very quickly, which is essential for proper operation of the mechanism.

The distance from the longitudinal median plane of the vehicle to the inner ends of the slots 15 and 15a is chosen so as to prevent the friction block from lowering so far that it engages in holes that are to be found in roadway surfaces, yet permitting a sufficient extension of the friction block or brush towards the surface to allow for variations in clearance between the vehicle frame and the roadway and to insure that the brush is applied with sufficient pressure.

According to another embodiment of the invention, an automatic means is added to the manual unlocking means under the control of the driver. To this end, there is provided under the vehicle frame an unlocking arrangement (FIGURES 7 and 8), comprising a vertical blade or vane 138 rigidly fixed to a sleeve 139 rotatably mounted—preferably with ball-bearings—on a spindle 140 fixed under the vehicle frame 1, such that the vane is free to oscillate about a middle position parallel to the median longitudinal plane of the vehicle. Switches 141, fixed under the frame 1 and connected in parallel with the driver's switch to control the power supply circuit of solenoid 43, are located on either side of the free end of the vane. These switches are actuated by buttons 142 urged towards vane 138 by loaded springs, not shown, housed in the switch boxes.

The combination as thus constituted is located at a point, determined for each kind of vehicle, where the eddy air currents, created when the vehicle moves, are not too strong. So long as the vehicle moves normally along the roadway—that is, with its longitudinal axis coincident with the direction of its movement—vane 138 remains parallel to the axis and neither switch 141 is closed. But when the vehicle begins skid, and the axis and the direction of movement are no longer coincident, the vane, controlled by the normal air current and remaining parallel to the direction of movement, assumes an oblique aspect with respect to the axis of the vehicle and presses on a button 142 of one of the switches 141, closing the circuit, powering the solenoid, and unlocking the friction brush or element 3.

Quite easily, the clearance between the buttons 142 and the center position of vane 138 and the tension of the loaded springs of the buttons can be adjusted, such that the automatic unlocking occurs only above a certain speed of the vehicle, say 35 or 40 miles per hour, and only for a given deviation of the vehicle from the path of its center of gravity 10° for example.

In order to avoid an untimely unlocking in case of a strong side wind, a switch disconnecting the automatic unlock arrangement from the mechanism can be provided.

The mechanism of the invention insures a high coefficient of friction. In dynamic tests conducted on ice, in which a vehicle travelling at about 50 miles per hour was put into a skid following a sharp cornering, the vehicle was straightened out in a very short distance by the operation of the friction brush or block. The tractive force, applied to the rear end at an angle of about 90° to the longitudinal axis of the vehicle, required to cause a stationary vehicle to skid on ice—that is, to slide without rolling of the wheels—has been measured. It has been found that a force of 20 kg. was sufficient for a vehicle weighing around 1200 kg. and under normal operating conditions, but that force greater than 150 kg. was necessary to cause the vehicle to slide when the friction mechanism of the invention was used.

The arrangement of the invention is capable of being immediately put into operation, due to the electrical control within reach of the driver. The locking system is simple and robust and automatically operated simply by raising the friction block.

The friction block of the invention does not risk damaging the customary roadways when it is used. It has already been pointed out that the number of metallic elements is approximately determined on the basis of the weight of the vehicle. In the case of about 60 elements for a vehicle weighing 1300 kg. and a downward force applied to the block on the surface of 120 kg., each metallic element exerts an average force of about 2 kg. This force is negligible and is incapable of damaging a normal roadway surface.

The mechanism of the invention can be used in all instances where an automobile is liable to skidding and immediate correction is desired. According to one remarkable characteristic of the invention, whatever the speed of the vehicle, the straightening out distance with the operation of the invention is substantially constant for a given condition or road surface. In fact, in conformance with the principle of the invention, the greater the speed and the kinetic energy, the stronger is the straightening couple, all other things being equal. The invention is also useful as an auxiliary or stand-by brake, should the regular brake system unexpectedly fail. Thus, if the brakes should fail because of overheating of the linings, resulting from too frequent or overly hard use, as in a mountain descent, the friction block can be used to reduce the speed of the vehicle to the point where the braking action of the motor safely can be used. It is also apparent that the invention can be used in a preventative manner; that is, when a hazardous route is undertaken—a slippery descent, for example—the friction block can be lowered at the outset in order to carry out otherwise highly difficult or impossible manoeuvring on a surface liable to cause skidding.

The invention, therefore, makes the automobile or other vehicle more safe to operate in cases where there is the possibility of skidding or failure of the brake system.

Although the invention has been described in detail in its application to an automobile, it is not limited to this application. It is applicable, quite obviously, to all other vehicles or, more generally, moving objects, that traverse a roadway during some part of their journey, including the various kinds of aircraft, including airplanes and helicopters.

What we claim is:

1. Apparatus for limiting skidding of a moving vehicle, for straightening out the vehicle on its intended course in response to a limited skidding of said vehicle, and for acting as an auxiliary brake, said apparatus comprising a support means having a front portion and a rear portion, the front portion being pivotally mounted on the vehicle to rock about an axis perpendicular to the longitudinal median plane of the vehicle and located at a point to the rear of the center of gravity of the vehicle; a friction means carried by said rear portion of said support means; actuating means for rocking said support means to position said friction means selectively in an upper position in which said friction means is clear of the ground surface and in a lower position in which said friction means engages the ground surface, said actuating means comprising a first bar member and a second bar member both disposed in a common plane perpendicular to the vehicle longitudinal axis and each having upper and lower ends, a pivot fixed with respect to said friction means with its axis substantially parallel to the vehicle longitudinal axis and pivotally mounting the lower ends of said first and second bar members, means disposed symmetrically on opposite sides of said vehicle longitudinal median plane and mounting the repective upper ends of said first and second bar members for guided movements on said vehicle along a common axis perpendicular to the vehicle longitudinal median plane, and resilient means for urging said first and second bar member upper ends relatively toward each other whereby to exert a downwardly directed force on said friction means tending to position the latter in its lower position; locking means effective during normal running of the vehicle for holding said friction means in its upper position against the urge of said resilient means; control means for disabling said locking means to enable said resilient means to move said friction means to its lower position; and restoring means for moving said friction means to its upper position and into locked relation to said locking means.

2. Apparatus according to claim 1 in which said friction means comprises a casing; a lower elastic mass and an upper elastic mass in said casing; and a plurality of rigid pins each having a tipped lower end and an upper end of substantial area, said pins extending through said lower elastic mass and the upper ends of said pins abutting said upper elastic mass, the tipped lower ends of said pins projecting downwardly beyond said lower elastic mass.

3. Apparatus according to claim 2 in which said pins are arranged to form at least two rows which converge toward the front of the vehicle.

4. Apparatus according to claim 3 in which said pins are inclined outwardly relatively to the vehicle as defined by a plane parallel to the longitudinal median plane of the vehicle, the angle of inclination of said pins being in the range 5°–25°.

5. Apparatus according to claim 1 wherein said symmetrically disposed means mounting the respective upper ends of said first and second bar members includes a first device connected to the upper end of said first bar member and a second device connected to the upper end of said second bar member, and wherein said resilient means comprises a rubber strap connected at one end to a first fixed point on said vehicle on the same side of said vehicle median plane as said first device and connected at its opposite end to a second fixed point on the same side of said vehicle median plane as said second device, said strap extending from said first fixed point to and around said second device, thence extending reversely to and around said first device and thence extending to said second fixed point.

6. Apparatus according to claim 1 wherein said locking means comprises a latch member fixed with respect to said friction means substantially in the vehicle longitudinal median plane; a plate mounted to turn about an axis fixed with respect to said vehicle and parallel to the vehicle longitudinal axis, at least a portion of said plate being substantially circularly shaped and said plate having at its periphery a first recess and a second recess defined in part by an elastic mass; a retaining element movably mounted on said vehicle and having a part normally extending into said first recess for holding said plate in a locking position in which said latch member is in said second recess and is supported by said elastic mass to hold said friction means in its upper position; elastic means for biasing said retaining element to yieldably hold said part in said first recess; an electromagnet on said vehicle; and an armature connected to said retaining element and being operable by energization of said electromagnet for moving said retaining element to withdraw said part from said first recess and thereby enable said plate to rotate to release said latch member from said second recess and permit said friction means to move to its lower position, said retaining element part riding on said substantially circular portion of said plate when said part is out of said first recess.

7. Apparatus according to claim 6 including means for effecting energizing of said electromagnet in response to deviation of the center of gravity of the vehicle from the direction of running of the vehicle.

8. Apparatus according to claim 7 in which said means for effecting energizing of said electromagnet includes a vane mounted to swing about an axis parallel to the vehicle longitudinal median plane and being normally positioned parallel to said plane; and two electrical switch means mounted respectively on opposite sides of said vane and being normally out of contact therewith but being respectively contactible thereby according to the direction of swinging of said vane from its normal position.

References Cited in the file of this patent

UNITED STATES PATENTS 1,631,115  Atwood _____ June 7, 1927

FOREIGN PATENTS

| | | |
|---|---|---|
| 41,657 | Denmark _____ | Feb. 5, 1930 |
| 702,643 | France _____ | Jan. 26, 1931 |
| 918,873 | France _____ | Nov. 12, 1946 |
| 703,138 | Germany _____ | Mar. 1, 1941 |
| 221,419 | Great Britain _____ | Sept. 11, 1924 |
| 73,185 | Sweden _____ | Nov. 24, 1931 |